(12) United States Patent
Ishigaki et al.

(10) Patent No.: US 10,438,739 B2
(45) Date of Patent: Oct. 8, 2019

(54) TRANSFORMER WITH INTEGRATED LEAKAGE INDUCTANCE

(71) Applicant: TOYOTA MOTOR ENGINEERING & MANUFACTURING NORTH AMERICA, INC., Erlanger, KY (US)

(72) Inventors: Masanori Ishigaki, Ann Arbor, MI (US); Jongwon Shin, Ann Arbor, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 523 days.

(21) Appl. No.: 15/146,524

(22) Filed: May 4, 2016

(65) Prior Publication Data
US 2017/0324343 A1  Nov. 9, 2017

(51) Int. Cl.
*H01F 38/08* (2006.01)
*H01F 27/32* (2006.01)
*H02M 3/335* (2006.01)

(52) U.S. Cl.
CPC ........... *H01F 38/08* (2013.01); *H01F 27/325* (2013.01); *H02M 3/33584* (2013.01)

(58) Field of Classification Search
CPC .............................. H01F 27/325; H01F 38/08
USPC .................. 336/212, 214, 220, 221, 222
See application file for complete search history.

(56) References Cited

U.S. PATENT DOCUMENTS

| | | | | |
|---|---|---|---|---|
| 3,553,620 A * | 1/1971 | Cielo | ........................ | G05F 1/62 336/180 |
| 6,317,021 B1 * | 11/2001 | Jansen | .................... | H01F 27/24 336/155 |
| 6,348,848 B1 * | 2/2002 | Herbert | ..................... | H01F 3/12 323/308 |
| 7,236,077 B1 | 6/2007 | Hsu | | |
| 7,825,537 B2 * | 11/2010 | Freer | ....................... | H02J 5/005 307/42 |
| 7,965,165 B2 | 6/2011 | Ikriannikov et al. | | |
| 8,143,952 B2 | 3/2012 | Kim et al. | | |
| 2004/0145439 A1 * | 7/2004 | Grilo | ....................... | H01F 19/08 336/145 |
| 2004/0263282 A1 * | 12/2004 | Kaku | ...................... | H01F 19/08 333/119 |

(Continued)

FOREIGN PATENT DOCUMENTS

| | | |
|---|---|---|
| CN | 104124045 A | 10/2014 |
| FR | 2 881 266 A1 | 7/2006 |
| JP | 2014127471 A * | 7/2014 |

Primary Examiner — Tszfung J Chan
(74) Attorney, Agent, or Firm — Oblon, McClelland, Maier & Neustadt, L.L.P.

(57) ABSTRACT

A transformer includes a magnetic core assembly including a cylindrical bobbin around which transformer windings are wrapped. Primary transformer windings are wrapped around the cylindrical bobbin of the magnetic core assembly with additional primary transformer windings that are extended to come in contact with one or more external surfaces of the magnetic core assembly. Secondary transformer windings are wrapped around the cylindrical bobbin of the magnetic core assembly with additional secondary transformer windings that are extended to come in contact with the one or more external surfaces of the magnetic core assembly.

19 Claims, 13 Drawing Sheets
(1 of 13 Drawing Sheet(s) Filed in Color)

(56) References Cited

U.S. PATENT DOCUMENTS

| | | | |
|---|---|---|---|
| 2005/0270805 A1* | 12/2005 | Yasumura | H02M 3/3376 363/16 |
| 2009/0046486 A1* | 2/2009 | Lu | H02M 3/285 363/45 |
| 2009/0230776 A1* | 9/2009 | Ochi | H01F 19/00 307/83 |
| 2010/0214052 A1* | 8/2010 | Berke | H01F 19/04 336/220 |
| 2011/0063065 A1* | 3/2011 | Hugues Douglas | H01F 3/10 336/170 |
| 2014/0225439 A1 | 8/2014 | Mao | |
| 2016/0027570 A1* | 1/2016 | Sakamoto | H01F 27/2804 336/200 |

* cited by examiner

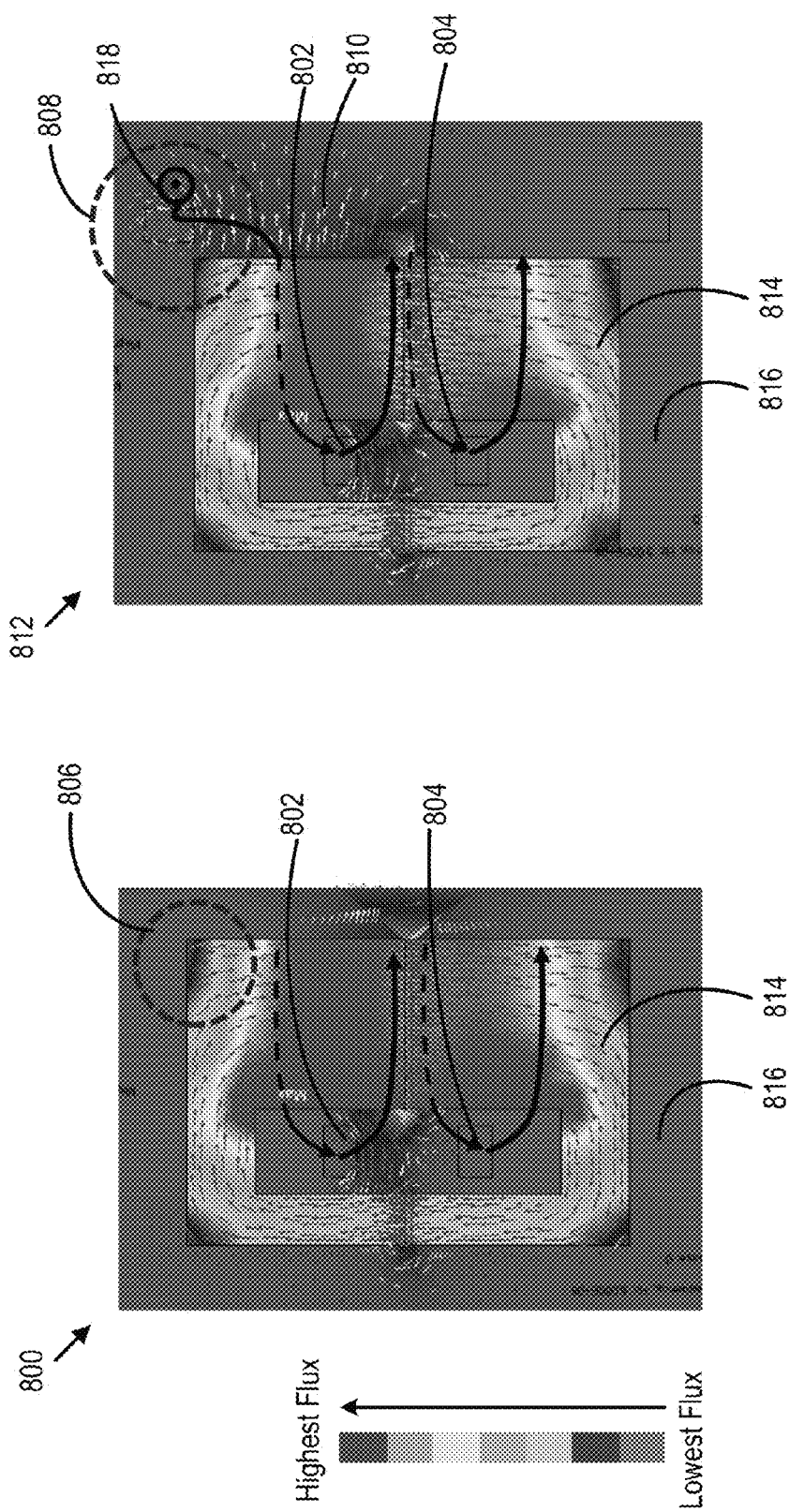

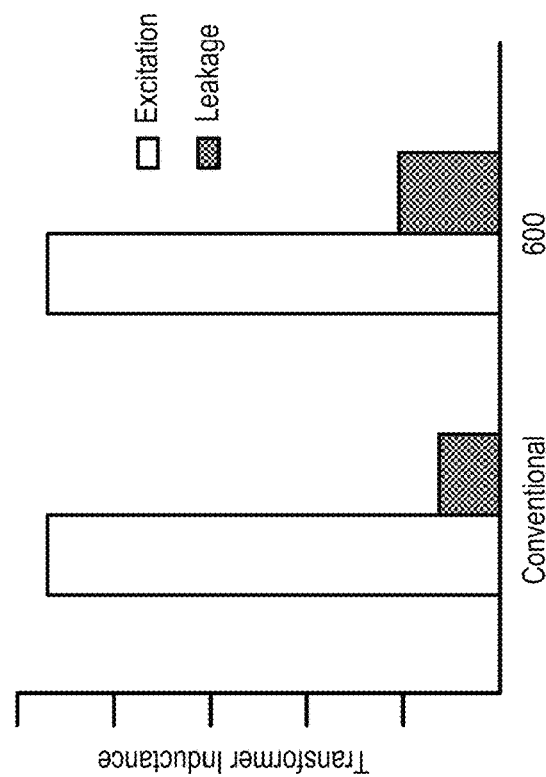

TRANSFORMER WITH INTEGRATED LEAKAGE INDUCTANCE

CROSS-REFERENCE TO RELATED PATENT APPLICATIONS

The present application incorporates by reference the entire contents of U.S. patent application Ser. No. 14/504,125 including common inventorship with the present application and filed in the U.S. Patent and Trademark Office on Oct. 1, 2014.

BACKGROUND

Design characteristics of a transformer such as an amount of leakage inductance or magnetic coupling between primary and secondary sides can have an impact on performance of a power conversion circuit. U.S. Pat. No. 7,236,077 to Hsu describes a transformer including adjustable leakage inductance where the amount of leakage inductance is adjusted based on an amount of overlap between primary and secondary coils around a magnetic core.

SUMMARY

In an exemplary implementation, a transformer can include a magnetic core assembly including a cylindrical bobbin around which transformer windings are wrapped. Primary transformer windings can be wrapped around the cylindrical bobbin of the magnetic core assembly with additional primary transformer windings that are extended to come in contact with one or more external surfaces of the magnetic core assembly. Secondary transformer windings can be wrapped around the cylindrical bobbin of the magnetic core assembly with additional secondary transformer windings that are extended to come in contact with the one or more external surfaces of the magnetic core assembly.

One or more properties of the primary transformer windings and secondary transformer windings wrapped around the cylindrical bobbin of the magnetic core assembly can be based on a predetermined amount of magnetic coupling between the primary transformer windings and the secondary transformer windings. The one or more properties of the primary transformer windings and the secondary transformer windings can include a turn ratio, amount of primary or secondary current, transformer losses, or flux density. The predetermined amount of magnetic coupling between the primary transformer windings and the secondary transformer windings can be based on an amount of inductive power transfer between a primary side and a secondary side of DC-DC power conversion circuitry. In addition, the predetermined amount of magnetic coupling between the primary transformer windings and the secondary transformer windings can be unaffected by the additional primary transformer windings and the additional secondary transformer windings. The predetermined amount of magnetic coupling between the primary transformer windings and the secondary transformer windings can be based on power or voltage characteristics of a power source or power sink connected to DC-DC power conversion circuitry on each side of the transformer.

A configuration of the additional primary transformer windings and the additional secondary transformer windings in contact with the one or more external surfaces of the magnetic core assembly can produce a first amount of leakage inductance. The first amount of leakage inductance produced by the additional primary transformer windings and the additional secondary transformer windings can be independent of a gap distance between a primary side and a secondary side of the magnetic core assembly. A total amount of leakage inductance of the transformer can include the first amount of leakage inductance produced by the additional primary transformer windings and the secondary transformer windings plus a second amount of leakage inductance produced by the primary transformer windings and the secondary transformer windings wrapped around the cylindrical bobbin of the magnetic core assembly.

The primary transformer windings and the additional primary transformer windings can be associated with a primary leakage inductance of DC-DC power conversion circuitry, and the secondary transformer windings and additional secondary transformer windings can be associated with a secondary leakage inductance of the DC-DC power conversion circuitry. The primary leakage inductance and the secondary leakage inductance can correspond to an amount of capacitive power transfer between a primary side and a secondary side of the DC-DC power conversion circuitry. The amount of capacitive power transfer between the primary side and the secondary side of the DC-DC power conversion circuitry can be based on series resonance between the primary leakage inductance or the secondary leakage inductance of the transformer and one or more capacitors of the DC-DC power conversion circuitry. The one or more capacitors can include a first capacitor and a second capacitor cross-connected across the transformer between the primary side and the secondary side of the DC-DC power conversion circuitry.

A configuration of the additional secondary transformer windings on the one or more external surfaces of the magnetic core assembly can be based on a first series resonance frequency between the first capacitor or the second capacitor and the secondary leakage inductance of the transformer. Also, a configuration of the additional primary transformer windings on the one or more external surfaces of the magnetic core assembly can be based on a second series resonance frequency between the first capacitor or the second capacitor and the primary leakage inductance of the transformer.

The additional primary transformer windings and the additional secondary transformer windings can be positioned on the one or more external surfaces of the magnetic core assembly at locations wherein an amount of magnetic flux of the primary transformer windings or the secondary transformer windings is less than a predetermined threshold.

The additional primary transformer windings and the additional secondary transformer windings can be configured on the one or more external surfaces of the magnetic core assembly based on power or voltage characteristics of a power source or power sink connected to DC-DC power conversion circuitry on each side of the transformer.

The magnetic core assembly can be a single-core assembly.

In a further exemplary implementation, a process can include determining desired amounts of leakage inductance for DC-DC power conversion circuitry based on power and voltage characteristics of a power source or power sink connected to the DC-DC power conversion circuitry on a primary side and a secondary side of a transformer; identifying one or more locations on one or more external surfaces of a magnetic core assembly of the transformer including an amount of magnetic flux that is less than a predetermined threshold; and increasing an amount of leakage inductance of the transformer to correspond to the desired amounts of leakage inductance for the DC-DC power conversion circuitry by extending primary and secondary windings of the transformer to come in contact with the one or more external surfaces of the magnetic core assembly including the amount of magnetic flux that is less than the predetermined threshold.

In a further exemplary implementation, a system can include a transformer including a magnetic core assembly with a cylindrical bobbin around which transformer windings are wrapped, primary transformer windings wrapped around the cylindrical bobbin of the magnetic core assembly with additional primary transformer windings that are extended to come in contact with one or more external surfaces of the magnetic core assembly, and secondary transformer windings wrapped around the cylindrical bobbin of the magnetic core assembly with additional secondary transformer windings that are extended to come in contact with the one or more external surfaces of the magnetic core assembly. The system can also include DC-DC power conversion circuitry including a first switch and a second switch on either side of the transformer with a first capacitor and a second capacitor cross-connected across the transformer.

The foregoing general description of exemplary implementations and the following detailed description thereof are merely exemplary aspects of the teachings of this disclosure, and are not restrictive.

BRIEF DESCRIPTION OF THE DRAWINGS

The patent or application file contains at least one drawing executed in color. Copies of this patent or application publication with colors drawings will be provided by the Office upon request and payment of the necessary fee.

A more complete appreciation of this disclosure and many of the attendant advantages thereof will be readily obtained as the same becomes better understood by reference to the following detailed description when considered in connection with the accompanying drawings, wherein:

FIG. 8A is an exemplary flux density profile for a transformer;

FIG. 8B is an exemplary flux density profile for a transformer;

FIG. 11A is an exemplary graph of flux density for transformers;

FIG. 11B is an exemplary graph of excitation and leakage inductance for transformers.

DETAILED DESCRIPTION

Figures 1A, 1B:
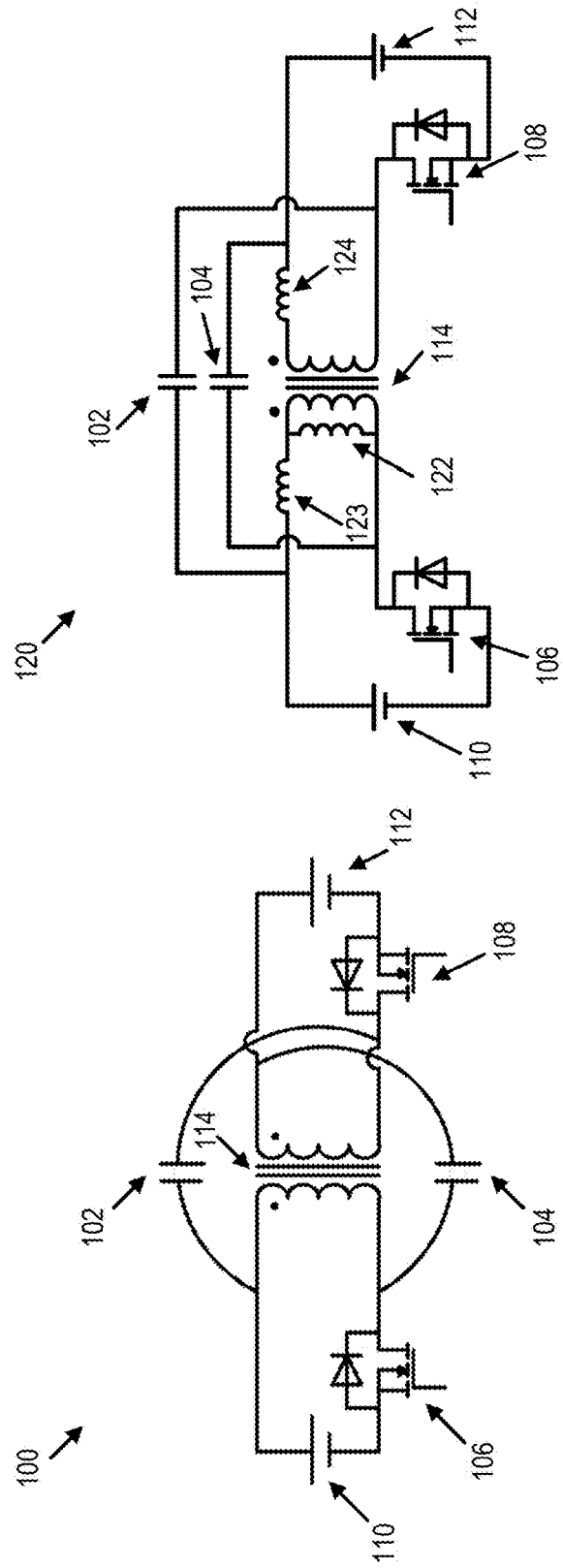
FIG. 1A is a schematic diagram of a DC-DC power conversion circuit.
FIG. 1B is a schematic diagram of a DC-DC power conversion circuit.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "about," and similar terms generally refer to ranges that include the identified value within a margin of 20%, 10%, or preferably 5%, and any values therebetween.

FIG. 1A is an exemplary illustration of a DC-DC power conversion circuit 100. The DC-DC power conversion circuit 100 can include a primary side and a secondary side that are symmetrical on either side of a magnetic core transformer 114. In an exemplary implementation, capacitors 102 and 104 can be cross-connected across the magnetic core transformer 114. The primary side can include a primary switch 106 and a primary DC power source 110, and the secondary side can include a secondary switch 108 and a secondary DC power source 112. The primary DC power source 110 and the secondary DC power source 112 can function as either a power source or a power sink depending on the direction of power transfer through the DC-DC power conversion circuit 100. In an implementation, the capacitance values of the cross-connected capacitors 102 and 104 can be equal. In addition, the capacitor 102 can be connected between a positive terminal of the primary DC power source 110 and a positive terminal of the secondary switch 108, and the capacitor 104 can be connected between a positive terminal of the secondary DC power source 112 and a positive terminal of the primary switch 106. The primary switch 106 and the secondary switch 108 can include a MOSFET with a diode connected from the source to the drain of the MOSFET. In some aspects, the turn ratio N of the magnetic core transformer 114 is determined based on the ratio of the voltage of the primary DC power source 110 to the voltage of the secondary DC power source 112.

In certain implementations, the DC-DC power conversion circuit 100 can be installed in an electrical system of a vehicle in order to transfer power from power sources to electrical loads. In some implementations, electrical components within a vehicle can act as either power sources or electrical loads depending on the application being carried out. For example, battery cells in an electric vehicle can act as an electrical load during charging operations when the vehicle is connected via a plug to an AC outlet. On the other hand, the battery cells can also act as power sources during discharge.

In order to allow the electrical components to operate as either power sources or electrical loads, the DC-DC power conversion circuit 100 can operate bi-directionally due to the symmetry between the primary and secondary sides. More specifically, power can be transferred from the primary side to the secondary side or from the secondary side to the primary side. The direction of power transfer is based on whether the primary switch 106 or the secondary switch 108 is turned on and off. For example, if power is being transferred from the primary side to the secondary side, the primary switch 106 is cycled on and off. If power is being transferred from the secondary side to the primary side, the secondary switch 108 is cycled on and off. In addition, the switch on the side of the DC-DC power conversion circuit 100 that is receiving power can function as a synchronous rectifier to reduce circuit losses. For example, when power is transferred from the primary side to the secondary side of the DC-DC power conversion circuit 100 by cycling the primary switch 106 on and off, the secondary switch 108 can be the synchronous rectifier that is turned on and off at predetermined time intervals to provide a current path through the secondary switch 108 rather than through the parallel-connected diode. In some implementations, the primary switch 106 and secondary switch 108 are controlled by gate drivers that are integrated into the primary switch 106 and the secondary switch 108.

In some implementations, the DC-DC power conversion circuit 100 can also include sensors that obtain sensor data from the components of the circuit, such as current sensors, voltage sensors, temperature sensors, and the like. For example, voltage sensors can measure voltage across the primary switch 106 or secondary switch 108 and can transmit the sensor data to a controller via a wired or wireless connection. The controller can control operations and detect failures of the DC-DC power conversion circuit 100 based on the received sensor data.

FIG. 1B is another exemplary schematic diagram of a DC-DC power conversion circuit 120, which is an implementation of the DC-DC power conversion circuit 100. Throughout the disclosure, the DC-DC power conversion circuit 100 and the DC-DC power conversion circuit 120 can be referred to interchangeably. In addition to the components described with respect to the DC-DC power conversion circuit 100 of FIG. 1A, the DC-DC power conversion circuit 120 can also include an excitation inductor 122 and leakage inductors 123 and 124. In some aspects, primary leakage inductor 123 is on the primary side and secondary leakage inductor 124 is on the secondary side of the DC-DC power conversion circuit 120. In some implementations, the magnetic core transformer 114 can be an ideal transformer, and the excitation inductor 122 and/or the leakage inductors 123 and 124 can illustrate an equivalent circuit for a real transformer.

The excitation inductor 122 can be added in parallel with the primary side of the magnetic core transformer 114 in order to account for non-zero reluctance within the magnetic core transformer 114. In some implementations, an inductance of the excitation inductor 122 can affect an amount of magnetic coupling between the primary side and the secondary side of the magnetic core transformer 114. In some implementations, the amount of magnetic coupling between the primary side and the secondary side of the magnetic core transformer 114 is based on a magnetic flux that develops as current passes through primary and secondary windings of the magnetic core transformer 114. The amount of magnetic coupling also corresponds to an amount of inductive power transfer that occurs between the primary side and the secondary side of the DC-DC power conversion circuit 120. The amount of magnetic coupling between the primary side and the secondary side of the magnetic core transformer 114 can be based on properties of the magnetic core transformer 114 or the DC-DC power conversion circuit 120 such as turn ratio, amount of primary or secondary current, transformer losses, flux density, or the like, which can be determined during construction of the magnetic core transformer 114. Details regarding the inductive power transfer are discussed further herein.

In addition, the leakage inductors 123 and 124 are associated with amounts of primary and secondary leakage inductance in the magnetic core transformer 114 and can demonstrate how imperfect coupling within the magnetic core transformer 114 can affect the functionality of the DC-DC power conversion circuit 120. In some implementations, the leakage inductance produced by the leakage inductors 123 and 124 can contribute to an amount of capacitive power transfer between the primary side and secondary side of the DC-DC power conversion circuit 120 via the cross-connected capacitors 102 and 104. The magnetic core transformer 114 can be designed to have predetermined leakage inductance characteristics based on the shape and configuration of primary and secondary windings of the magnetic core transformer 114. Details regarding the capacitive power transfer and design of the magnetic core transformer 114 are discussed further herein.

Figure 2:
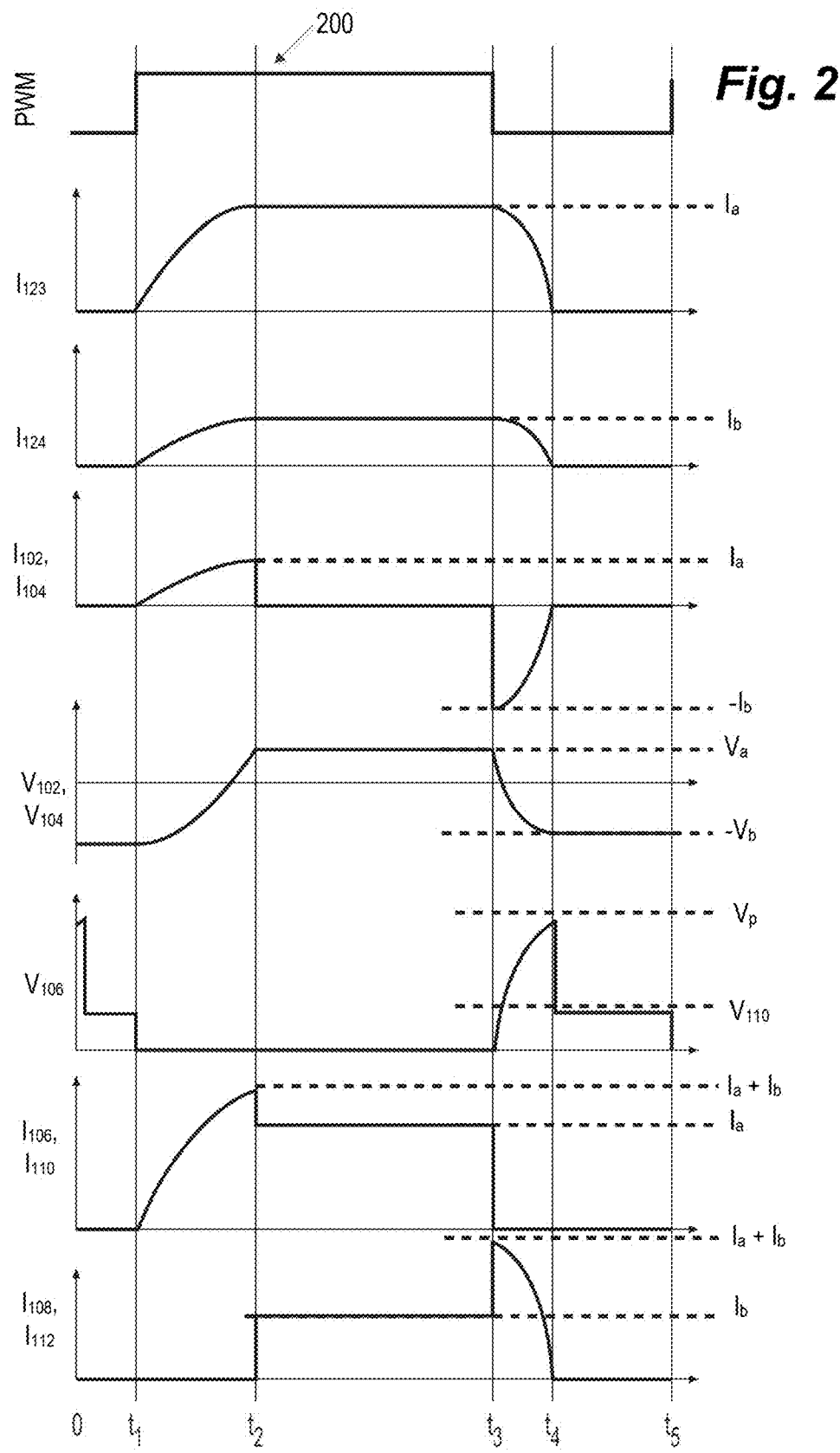
FIG. 2 is an exemplary illustration of current, voltage, and power waveforms for a DC-DC power conversion circuit.

FIG. 2 is an exemplary illustration of current, voltage, and power waveforms of the DC-DC power conversion circuit 120 with respect to time for one duty cycle of the primary switch 106. For example, graph 200 illustrates a duty cycle for the primary switch 106 that can be turned on at time $t_1$ and subsequently turned off at time $t_3$, according to some implementations. At time $t_5$, another duty cycle can commence. The amount of power transferred from the primary side to the secondary side of the DC-DC power conversion circuit 100 can be modified by changing the duty cycle or the switching frequency of the primary switch 106. To increase the amount of power transferred from the primary side to the secondary side of the DC-DC power conversion circuit 120 the amount of on-time of the primary switch 106 is increased while the off-time of the primary switch 106 may remain constant, according to one implementation.

In some implementations, bi-directional power transfer can be performed by transferring power from the secondary side to the primary side of the DC-DC power conversion circuit 120 by cycling the secondary switch 108 on and off. The description of the transfer of power from the secondary side to the primary side of the DC-DC power conversion circuit 120 can also be applied to bi-directional power transfer in a straightforward way to one of ordinary skill in the art.

The duty cycle, switching frequency, and direction of power transfer within the DC-DC power conversion circuit 120 can be controlled by one or more electronic control units (ECUs) or similar circuitry. For example, sensors can be installed within battery cells of an electric vehicle (EV) that can sense battery state of charge (SOC), voltage, and the like. In an implementation, the ECUs can process sensor data, display battery SOC information to a user, and send control signals to actuators that align the DC-DC power conversion circuit 120. The ECUs can control the direction of power transfer as well as the quantity of power transferred by the DC-DC power conversion circuit 120 by controlling the duty cycles and switching frequencies of the primary switch 106 and the secondary switch 108. The ECUs can also align the DC-DC power conversion circuit 120 to perform functions determined by input from a user.

Between times 0 and $t_1$, the primary switch 106 is off, and capacitors 102 and 104 are negatively charged, according to some implementations. The voltage of the capacitors, $V_{102}$ and $V_{103}$ can be at a maximum negative value, $-V_b$, and no current is flowing through the DC-DC power conversion circuit 120. In addition, the voltage at the primary switch $V_{106}$ can be equal to the voltage of the primary DC power source $V_{110}$.

At time $t_1$, the primary switch 106 can be turned on. In some aspects, the primary switch 106 is turned on when the current through the primary switch $I_{106}$ is zero, which is a type of soft switching that can be referred to as zero current switching (ZCS). In some implementations, switching losses can be reduced when turning on the primary switch 106 by implementing ZCS. Between times $t_1$ and $t_2$, the capacitors 102 and 104 discharge energy through the leakage inductors 123 and 124, and LC resonance can occur. The voltage at the capacitors $V_{102}$ and $V_{104}$ can also increase until a maximum voltage of $V_a$ is reached, according to some aspects.

In some implementations, the current through the leakage inductors $I_{123}$ and $I_{124}$ can increase in a sinusoidal pattern due to series resonance of the DC-DC power conversion circuit 120. The leakage inductor current $I_{123}$ can reach a maximum value at time $t_2$ of $I_a$. The current through the capacitors $I_{102}$ and $I_{104}$ can also increase in a sinusoidal pattern to a maximum value of $I_a$ at time $t_2$. In an implementation, $I_a$ can be the maximum amount of current on the primary side of the DC-DC power conversion circuit 120. The leakage inductor current $I_{124}$ can reach a maximum value at time $t_2$ of $I_b$, which can be defined by the equation, $$I_b = \frac{I_a}{N}.$$

In an implementation, $I_b$ can be the maximum amount of current on the secondary side of the DC-DC power conversion circuit 120. Due to the series resonance, the current through the primary DC power source $I_{110}$ and the current through the primary switch $I_{106}$ can increase in a sinusoidal pattern to a maximum value of $I_a+I_b$ at time $t_2$.

Figures 3A, 3B:
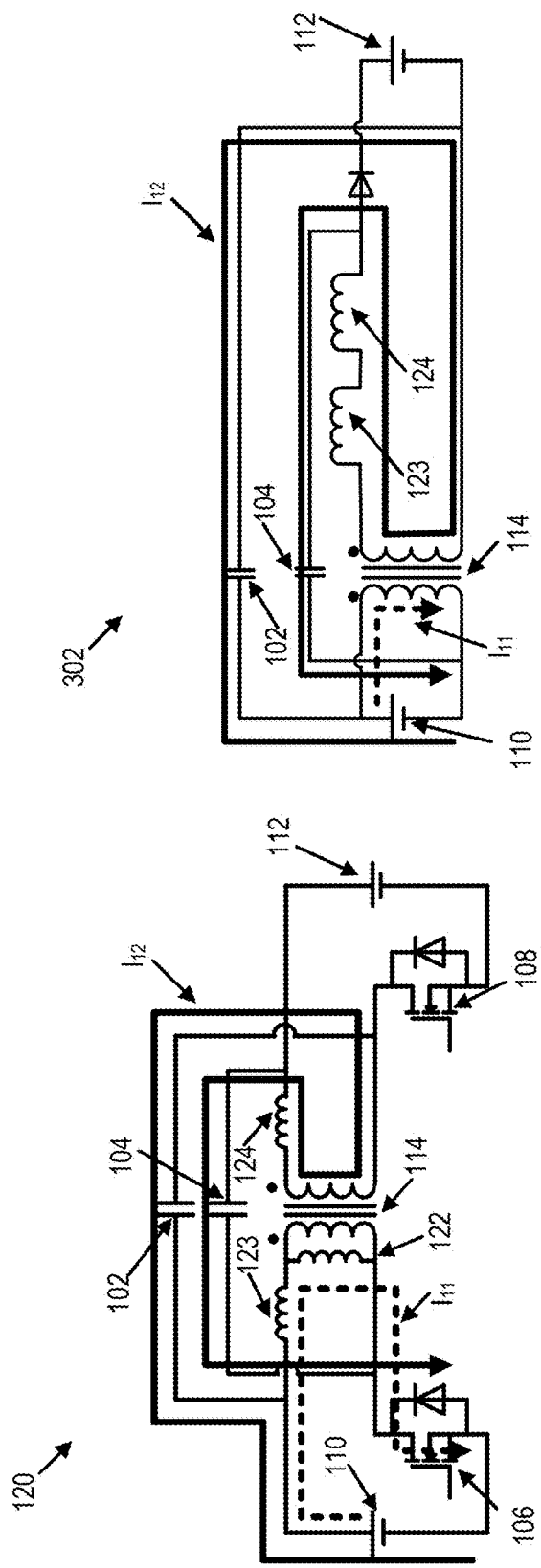
FIG. 3A illustrates exemplary current flow paths in a DC-DC power conversion circuit.
FIG. 3B illustrates exemplary current flow paths in a DC-DC power conversion circuit.

FIG. 3A illustrates current flow paths in a DC-DC power conversion circuit 120 between times $t_1$ and $t_2$, and FIG. 3B is an illustration of current flow paths through an equivalent circuit between times $t_1$ and $t_2$. Currents $I_{11}$ and $I_{12}$ illustrate current flow paths through the DC-DC power conversion circuit 120 between times $t_1$ and $t_2$. Current $I_{11}$ can illustrate current flow on the primary side of the DC-DC power conversion circuit 120, and current $I_{12}$ can illustrate how current flows between the primary and secondary sides of the DC-DC power conversion circuit 120 through the cross-connected capacitors 102 and 104. The relationship between current $I_{11}$ and current $I_{12}$ can be defined by the equation, $I_{11}=NI_{12}$, according to certain embodiments. A first resonant frequency, $\omega_1$, can be defined by the equation, $$\omega_1 = \frac{1}{\sqrt{2L_{124}\frac{C_{102}}{2}}} = \frac{1}{\sqrt{L_{124}C_{102}}}.$$

$L_{124}$ can be an inductance of the secondary leakage inductor 124 and $C_{102}$ can be a capacitance of the capacitor 102, according to an implementation.

Referring back to FIG. 2, at time $t_2$, the secondary switch 108 diode turns on when the sum of the voltages at the leakage inductors 123 and 124 is equal to the sum of the voltage of the secondary DC power source 112 and the voltage of the secondary switch 108 diode, which can be explained by the equation, $V_{123}+V_{124}=V_{112}+V_{Diode}$. In some implementations, the secondary switch 108 may be turned on at time $t_2$ to function as a synchronous rectifier in order to reduce circuit losses. When the secondary switch 108 diode turns on or the secondary switch 108 is turned on, capacitor currents $I_{102}$ and $I_{104}$ go to zero, and power is transferred from the primary side to the secondary side of the DC-DC power conversion circuit 120 through the magnetic core transformer 114. The power transfer through the magnetic core transformer 114 between times $t_2$ and $t_3$ can be referred to as inductive power transfer or magnetic power transfer, according to an implementation. The amount of inductive power transfer that occurs can be based on power and voltage characteristics of the power sources and sinks of the DC-DC power conversion circuit 120, magnetic coupling characteristics of the primary and secondary windings of the magnetic core transformer 114, on-time of the primary switch 106, and the like. The primary switch current $I_{106}$ and the current through the primary DC power source $I_{110}$ are at a constant value $I_a$ during the inductive power transfer. The secondary switch current $I_{108}$ and the current through the secondary DC power source $I_{112}$ are at a constant value $I_b$ during the inductive power transfer.

Figure 3C:
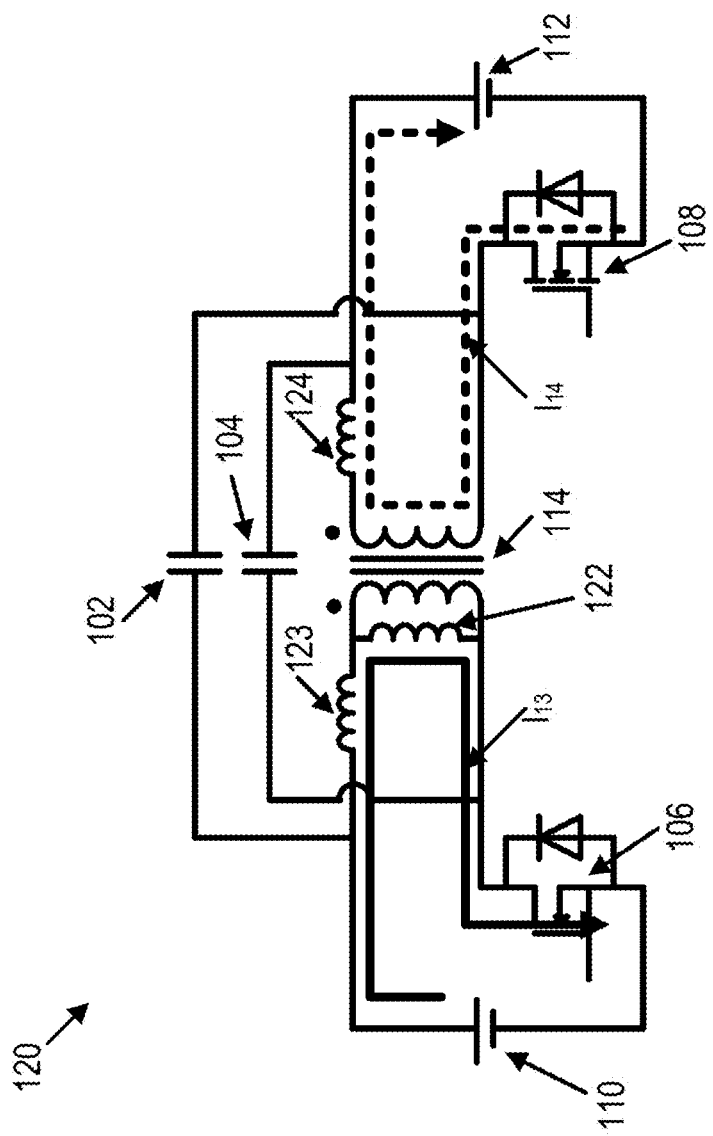
FIG. 3C illustrates exemplary current flow paths in a DC-DC power conversion circuit.

FIG. 3C illustrates current flow paths in a DC-DC power conversion circuit 120 between times $t_2$ and $t_3$. $I_{13}$ illustrates how current flows from the primary DC power source 110 through the magnetic core transformer 114, which causes inductive power transfer to the secondary side of the DC-DC power conversion circuit 120, which can be illustrated by current $I_{14}$. The quantity of power, $P_1$, transferred from the primary side to the secondary side of the DC-DC power conversion circuit 120 between times $t_2$ and $t_3$ can be approximately described by the equation, $$P_1 \cong \frac{V_{110}I_a}{T}\left(DT - \frac{\pi}{2\omega_1}\right) \cong \frac{V_{112}I_b}{T}\left(DT - \frac{\pi}{2\omega_1}\right).$$

$V_{110}$ is the voltage at the primary DC power source 110 and $V_{112}$ can be the voltage at the secondary DC power source 112. D can refer to the duty cycle of the primary switch 106, and T can refer to the period of the primary switch 106. In an implementation, control circuitry can control the duty cycle D and length of the period T based on the amount of power to be transferred from the primary side to the secondary side of the DC-DC power conversion circuit 120.

Referring back to FIG. 2, at time $t_3$, the primary switch 106 is turned off when the voltage at the primary switch $V_{106}$ is zero, which can be referred to as zero voltage switching (ZVS). In some implementations, switching losses can be reduced when turning off the primary switch 106 by implementing ZVS. Power can be transferred from the primary side to the secondary side of the DC-DC power conversion circuit 120 through capacitors 102 and 104. Between times $t_3$ and $t_4$, the DC-DC power conversion circuit 100 can experience series resonance at a second resonant frequency, $\omega_2$, which can be described by the equation, $$\omega_2 = \frac{1}{\sqrt{2\frac{C_{102}}{2}L_{123}}} = N\omega_1.$$

$L_{123}$ can be an inductance of the primary leakage inductor 123 and $C_{102}$ can be a capacitance of the capacitor 102, according to an implementation. In addition, the voltage at the primary switch $V_{106}$ increases in a sinusoidal fashion between times $t_3$ and $t_4$ until voltage $V_p$ is reached at time $t_4$. In some implementations voltage $V_p$ can be described by equation, $V_p=2V_a+2V_b$.

Figure 3E:
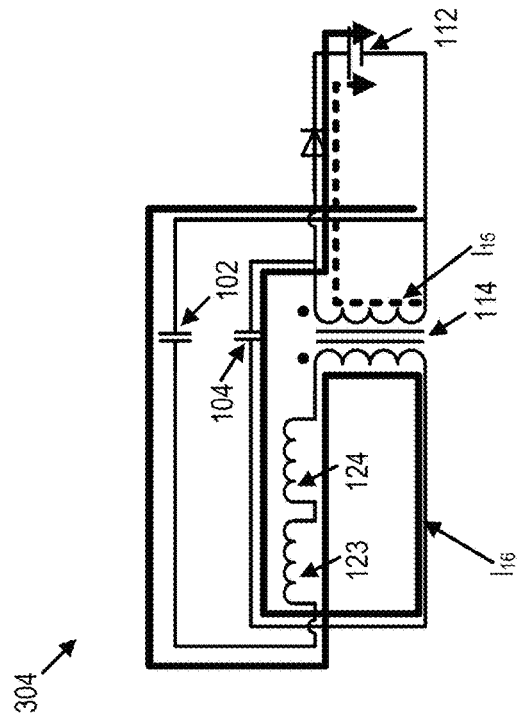
FIG. 3E illustrates exemplary current flow paths in a DC-DC power conversion circuit.
Figure 3D:
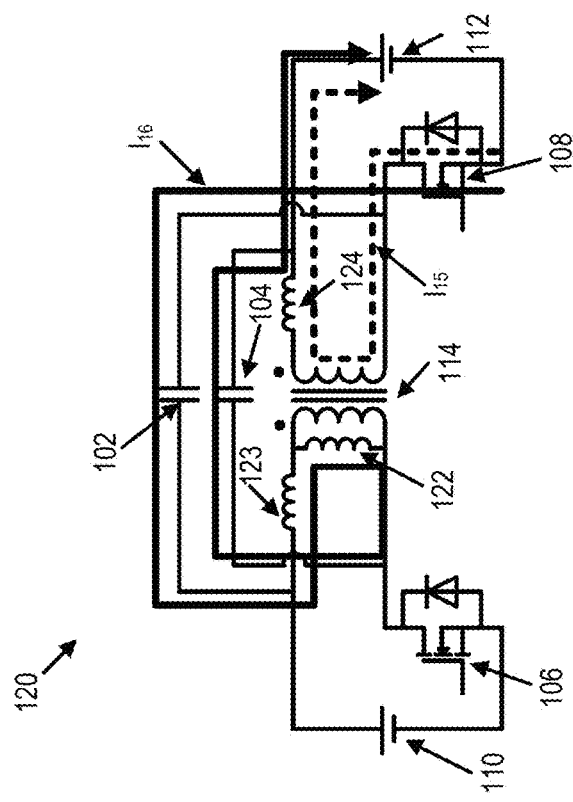
FIG. 3D illustrates exemplary current flow paths in a DC-DC power conversion circuit.

FIG. 3D illustrates current flow paths in a DC-DC power conversion circuit 120 between times $t_3$ and $t_4$, and FIG. 3E is an illustration of current flow paths through an equivalent circuit between times $t_3$ and $t_4$. Currents $I_{15}$ and $I_{16}$ illustrate the current flow path through the DC-DC power conversion circuit 120 between times $t_3$ and $t_4$. Current $I_{15}$ can illustrate current flow on the secondary side of the DC-DC power conversion circuit 120, and current $I_{16}$ can illustrate how current flows between the primary and secondary sides of the DC-DC power conversion circuit 120 through the cross-connected capacitors 102 and 104 to accomplish capacitive power transfer. The relationship between current $I_{15}$ and current $I_{16}$ can be defined by the equation, $I_{16}=NI_{15}$, according to certain implementations. Due to the series resonance, the leakage inductor currents $I_{123}$ and $I_{124}$ decrease in a sinusoidal pattern until the leakage inductor currents $I_{123}$ and $I_{124}$ go to zero at time $t4$ and the series resonance ends. In addition, capacitor currents $I_{102}$ and $I_{104}$ go from a minimum value of $-I_b$ to zero between times $t_3$ and $t_4$, and the capacitor voltages $V_{102}$ and $V_{104}$ become negatively charged and reach a voltage of $V_b$ at time $t_4$. Current through the secondary switch $I_{108}$ and secondary DC power source $I_{112}$ can decrease in a sinusoidal pattern from a maximum value of $I_a+I_b$ at time $t_3$ to zero at time $t_4$.

The quantity of power, $P_2$, transferred from the primary to the secondary side of the DC-DC power conversion circuit 120 between times $t_3$ and $t_4$ can be approximately described by the equation, $$P_2 \cong \frac{V_{112}(I_a + I_b)}{T\omega_2} \cong \frac{V_{112}I_b(1+N)}{T\omega_2}.$$

At time $t_4$, the DC-DC power conversion circuit 120 returns to a status that corresponds to the circuit status at time 0. For example, the capacitor voltages $V_{102}$ and $V_{104}$ at time $t_4$ can be equal to the capacitor voltage at time 0.

In some implementations, the relationship between $I_b$ and $V_a$ can be described by the equation, $$I_b = V_a \sqrt{2(1+A^2)\frac{C_{102}}{L_{123}}}, \text{ where } A = \frac{\{2\omega NDT - 2(N+1)+\pi\}}{\{2\omega N(1-D)T + 2(N+1)-\pi\}}.$$

Therefore, the total power transferred from the primary side to the secondary side of the DC-DC power conversion circuit 120 can be approximately described by the equation, $$P_{ps} \cong P_1 + P_2 \cong \left\{\frac{2(1+N)-N\pi}{2\omega_2} + DT\right\}\frac{V_{112}I_b}{T}.$$

Figure 4:
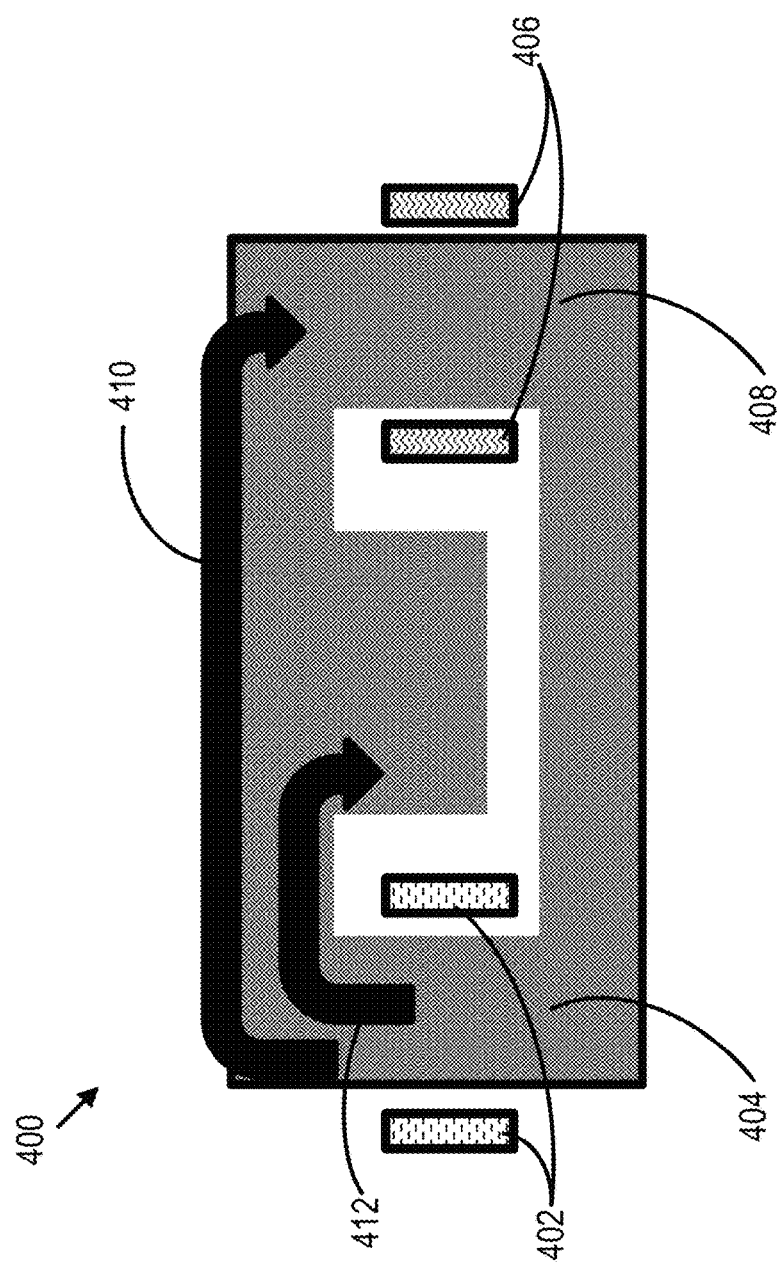
FIG. 4 is an exemplary illustration of a related art transformer.

FIG. 4 is an exemplary illustration of a cross-section of a related art transformer 400. The transformer 400 is one implementation of the magnetic core transformer 114 of the DC-DC power conversion circuit 120 that includes an additional magnetic core to control an amount of coupling between primary windings 402 and secondary windings 406. The transformer 400 has a magnetic core assembly with two cores around which the primary windings 402 and the secondary windings 406 are wrapped. For example, the primary windings 402 are wrapped around magnetic core 404, and the secondary windings 406 are wrapped around magnetic core 408. As power is transferred from the primary side to the secondary side of the DC-DC power conversion circuit 120, a magnetic flux coupling path 410 is produced between the primary windings 402 and the secondary windings 406 of the transformer 400. The structure of the magnetic core assembly of the transformer 400 also results in an uncoupled or leakage flux path 412 that corresponds to an amount of leakage inductance of the transformer 400. However, the two magnetic cores 404 and 408 result in increased size as well as increased losses of the transformer 400.

Figure 5B:
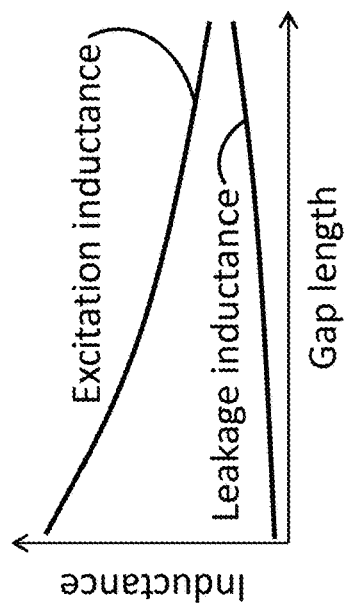
FIG. 5B is an exemplary graph of inductance versus gap length for a related art transformer.
Figure 5A:
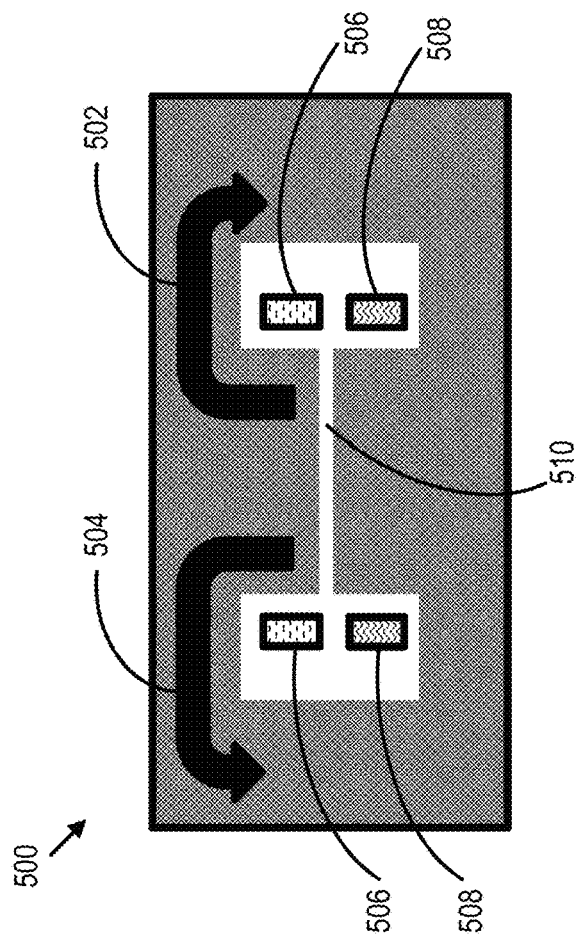
FIG. 5A is an exemplary illustration of a related art transformer.

FIG. 5A is an exemplary illustration of a cross-section of a related art transformer 500. The transformer 500 is one implementation of the magnetic core transformer 114 of the DC-DC power conversion circuit 120 that includes an air gap 510 in a magnetic core between a primary side and a secondary side of a magnetic core assembly. For example, primary windings 506 and secondary windings 508 are wrapped around the magnetic core and are separated by the air gap 510. As power is transferred from the primary side to the secondary side of the DC-DC power conversion circuit 120, magnetic flux coupling paths 502 and 504 are produced between the primary windings 506 and the secondary windings 508 of the transformer 500. In some implementations, an amount of leakage inductance of the transformer 500 is controlled by increasing or decreasing a length of the air gap 510 between the primary windings 506 and the secondary windings 508.

For example, FIG. 5B is an exemplary graph of inductance versus the length of the air gap 510 for the transformer 500. The graph includes curves associated with excitation inductance and leakage inductance of the transformer 500. The leakage inductance of the transformer 500 can be increased by increasing the length of the air gap 510 that separates the primary windings 506 from the secondary windings 508. However, the excitation inductance of the transformer 500 also decreases as the length of the air gap 510 increases, which can decrease a predictability of performance characteristics of the transformer 500 and make an amount of magnetic coupling between the primary windings 506 and secondary windings 508 more difficult to control.

Figure 7:
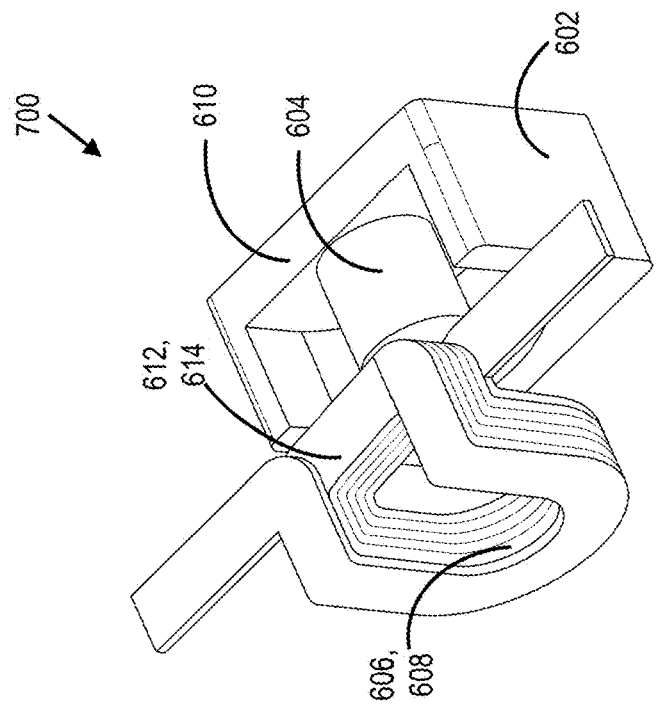
FIG. 7 is an exemplary illustration of half of a transformer.
Figure 6:
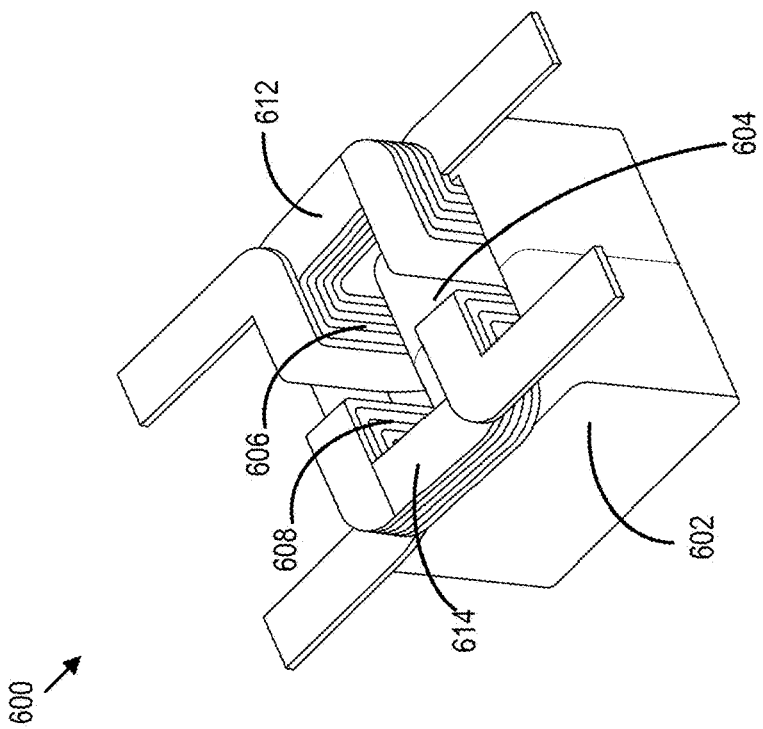
FIG. 6 is an exemplary illustration of a transformer.

FIG. 6 is an exemplary illustration of a transformer 600 that can be implemented as the magnetic core transformer 114 in the DC-DC power conversion circuit 120, and FIG. 7 is an exemplary illustration of one half 700 of the transformer 600 that provides better visibility of the magnetic core and transformer windings. The half 700 of the transformer 600 shown in FIG. 7 can be either a primary half or a secondary half of the transformer 600. The transformer 600 can also be implemented in other types of circuits that operate with a controlled amount of leakage inductance in the transformer 600. The transformer 600 can interchangeably be referred to as an integrated transformer-inductor because of the magnetic flux and leakage flux properties of the transformer 600.

In some implementations, the transformer 600 includes a magnetic core assembly 602 that has a single magnetic core 604 such as a cylindrical bobbin around which primary windings 606 and secondary windings 608 of the transformer 600 are wrapped. The primary windings 606 and the secondary windings 608 can be designed to have a corresponding amount of magnetic coupling that is based on one or more properties of the transformer 600 such as a turn ratio between the primary windings 606 and the secondary windings 608, current through the primary windings 606 or the secondary windings 608, transformer core losses, flux density, or the like. In some implementations, the amount of magnetic coupling between the primary side and the secondary side of the transformer 600 is based on a magnetic flux that develops as current passes through primary windings 606 and secondary windings 608 of the transformer 600. The amount of magnetic coupling between the primary windings 606 and secondary windings 608 can also be based on power and voltage characteristics of power sources and power sinks that transmit and receive power via the DC-DC power conversion circuit 120, such as the primary DC power source 110 or the secondary DC power source 112. In addition, the amount of magnetic flux between the primary windings 606 and secondary windings 608 of the transformer 600 can be based on the amount of inductive power transfer between the primary side and the secondary side of the DC-DC power conversion circuit 120.

The primary windings 606 and the secondary windings 608 can also have corresponding amounts of leakage inductance that are based on an amount of uncoupled flux in the primary windings 606 and the secondary windings 608. In some implementations, the transformer 600 can be implemented in circuits that have operating characteristics that are based on including predetermined amounts of leakage inductance in the transformer 600, such as the DC-DC power conversion circuit 120. To increase the amount of primary leakage inductance, the primary windings 606 can also include additional primary windings 612 that are extended to come in contact with one or more external surfaces 610 (see FIG. 7) of the magnetic core assembly 602. Likewise, to increase the amount of secondary leakage inductance, the secondary windings 608 can also include additional secondary windings 614 that are extended to come in contact the one or more external surfaces 610 of the magnetic core assembly 602.

The additional primary windings 612 can contribute an amount of leakage inductance in addition to the leakage inductance from the primary windings 606 that corresponds to a total inductance of the primary leakage inductor 123 of the DC-DC power conversion circuit 120. Also, the additional secondary windings 614 can contribute an amount of leakage inductance in addition to the leakage inductance from the secondary windings to the secondary leakage inductor 124 of the DC-DC power conversion circuit 120. Even though the additional primary windings 612 are extensions of the primary windings 606 and the additional secondary windings 614 are extensions of the secondary windings 608, references to the primary windings 606 and the secondary windings 608 throughout the disclosure refer to the windings that are wrapped around the magnetic core 604. References to the additional primary windings 612 and additional secondary windings 614 throughout the disclosure refer to the windings that are extended to come in contact with the external surfaces 610 of the magnetic core assembly 602.

In one implementation, the external surfaces 610 where the additional primary windings 612 and additional secondary windings 614 are extended can be locations where the amount of magnetic flux from the primary windings 606 and secondary windings 608 is less than a predetermined threshold. For example, the magnetic flux from the primary windings 606 and secondary windings 608 may be concentrated around the magnetic core 604 and other internal surfaces of the magnetic core assembly 602 and may be less than the predetermined threshold on the external surfaces 610 of the magnetic core assembly 602.

The additional primary windings 612 and additional secondary windings 614 can contribute to an increase in the primary and secondary leakage inductance of the transformer 600 by increasing the leakage flux without affecting the magnetic coupling between the primary windings 606 and secondary windings 608. In addition, the amount of leakage inductance produced by the additional primary windings 612 and the additional secondary windings 614 can be independent of a length of a gap distance between a primary side and secondary side of the magnetic core assembly 602.

The additional primary windings 612 and the additional secondary windings 614 can be configured on the external surfaces 610 of the magnetic core assembly 602 to achieve predetermined amounts of inductance for the primary leakage inductor 123 and the secondary leakage inductor 124 associated with the capacitive power transfer in the DC-DC power conversion circuit 120. For example, the amount of capacitive power transfer between the primary side and secondary side of the DC-DC power conversion circuit 120 is based on series resonance that occurs between the primary leakage inductor 123 or secondary leakage inductor 124 and the cross-connected capacitors 102 or 104. When power is transferred from the primary side to the secondary side of the DC-DC power conversion circuit 120 during a duty cycle of the primary switch 106, a first capacitive power transfer time period occurs before an inductive power transfer time period, and a second capacitive power transfer time period occurs after the inductive power transfer time period. The first capacitive power transfer time period can be associated with the first resonant frequency, $\omega_1$, that can be defined by the equation, $$\omega_1 = \frac{1}{\sqrt{2L_{124}\frac{C_{102}}{2}}} = \frac{1}{\sqrt{L_{124}C_{102}}}.$$

The second capacitive power transfer time period can be associated with the second resonant frequency, $\omega_2$, which can be described by the equation, $$\omega_2 = \frac{1}{\sqrt{2\frac{C_{102}}{2}L_{123}}} = N\omega_1.$$

In some aspects, one or more characteristics of the additional primary windings 612 and additional secondary windings 614 are based on achieving the predetermined amounts of inductance for the primary leakage inductor 123 and secondary leakage inductor 124. In one implementation, the one or more characteristics of the additional primary windings 612 and additional secondary windings 614 can include a shape, number of windings, or number of the external surfaces 610 in contact with the additional primary transformer windings 612 and additional secondary transformer windings 614.

FIG. 8A is an exemplary flux density profile 800 for the transformer 600 without the additional primary windings 612 or additional secondary windings 614 in contact with the one or more external surfaces 610 of the magnetic core assembly 602. In some implementations, the locations on the one or more external surfaces 610 of the magnetic core assembly 602 that have an amount of magnetic flux that is less than the predetermined threshold can be determined based on the flux density profile 800 for the transformer 600 without the additional primary windings 612 and additional secondary windings 614. For example, the flux density profile 800 includes amounts of flux density for a magnetic core assembly with primary windings 802 and secondary windings 804 wrapped around the magnetic core. The flux density profile 800 shows that a highest amount of flux is present on the internal surfaces and around the magnetic core of the transformer 600 as shown by region 814 of the flux density profile 800. In addition, a lowest amount of flux may be present on the external surfaces 610 of the magnetic core assembly 602 as shown by region 816 of the flux density profile 800. In one implementation, region 806 corresponds to an external corner of the magnetic core assembly 602 that has an amount of magnetic flux that is less than the predetermined threshold. The additional primary windings 612 may be extended to come in contact with the external corner of the magnetic core assembly 602 at the region 806 in order to increase the leakage inductance of the transformer 600.

FIG. 8B is an exemplary flux density profile 812 for the transformer 600 with the additional primary windings 818 extended from the primary windings 802 to come in contact with an external corner 808 of the magnetic core assembly 602 where the amount of magnetic flux is less than the predetermined threshold in order to increase the inductance of the primary leakage inductor 123 of the DC-DC power conversion circuit 120. Like the flux density profile 800, the flux density profile 812 shows that a highest amount of flux is present on the internal surfaces and around the magnetic core of the transformer 600 as shown by region 814 of the flux density profile 800. In addition, a lowest amount of flux may be present on the external surfaces 610 of the magnetic core assembly 602 as shown by region 816 of the flux density profile 812. For example, the additional primary windings 818 can be extended to region 808 that corresponds to an external corner of the magnetic core assembly 602. The flux density profile 812 shows that the additional primary windings 818 produce an increased amount of leakage flux 810 in the region 816 that has the lowest amount of magnetic flux. Additional secondary windings are not shown in the flux density profile 812 but can similarly be extended from the secondary windings 804 to come in contact with the external surfaces 610 that have a magnetic flux that is less than the predetermined threshold in order to increase the inductance of the secondary leakage inductor 124 of the DC-DC power conversion circuit 120.

Figure 9:
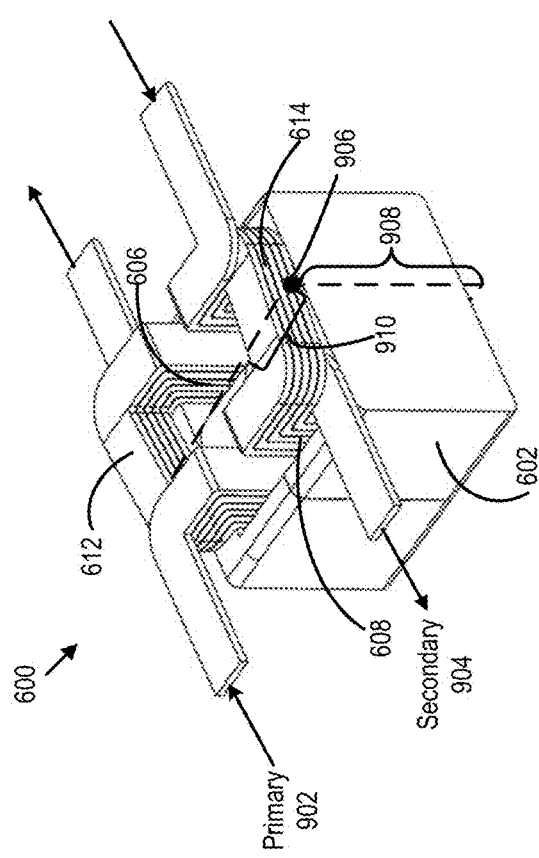
FIG. 9 is an exemplary illustration of a transformer.

FIG. 9 is an exemplary illustration of a transformer 600 with the additional primary windings 612 and additional secondary windings 614 extended to come in contact with the one or more external surfaces 610 of the magnetic core assembly 602 in order to increase the amount of primary and secondary leakage inductance of the transformer 600. FIG. 9 also shows primary current flow path 902 through the primary windings 606 and additional primary windings 612 and secondary current flow path 904 through the secondary windings 608 and the additional secondary windings 614. FIG. 9 also includes reference point 906 at an external corner on the secondary side of the magnetic core assembly 602 that can be used to develop flux simulation results shown in FIG. 10A and FIG. 10B. In addition, the flux simulation results can be determined along a longitudinal axis 908 and a perpendicular axis 908 along the external surface 610 of the magnetic core assembly 602.

Figure 10A:
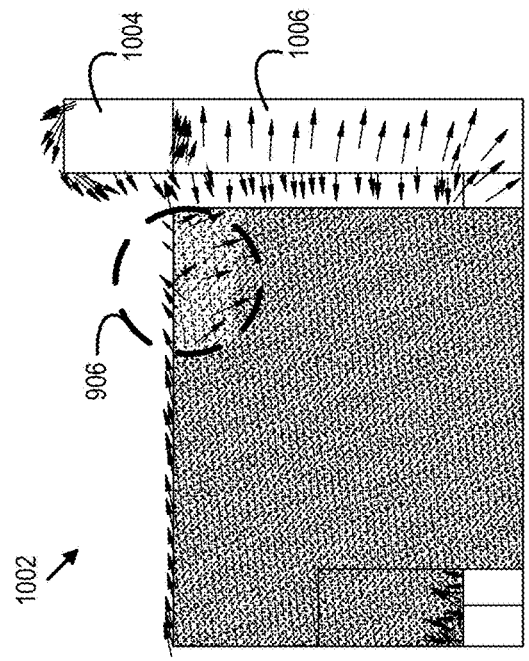
FIG. 10A is an exemplary flux density profile for a transformer.
Figure 10B:
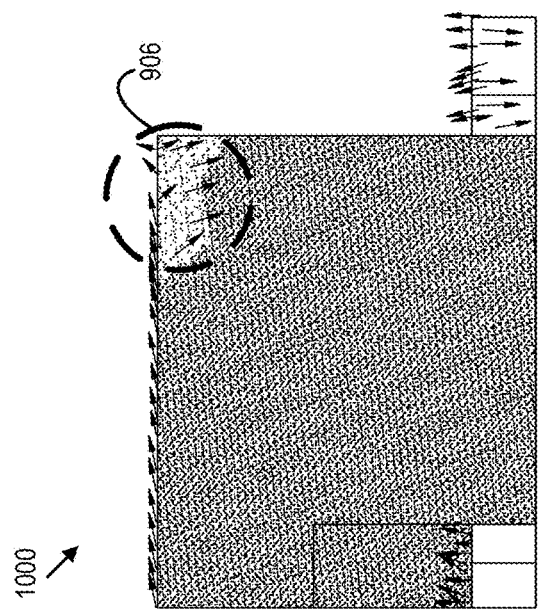
FIG. 10B is an exemplary flux density profile for a transformer.

FIG. 10A is an exemplary flux density profile 1000 at the external corner reference point 906 for the transformer 600 without the additional primary windings 612 and the additional secondary windings 614, and FIG. 10B is an exemplary flux density profile 1002 at the external corner reference point 906 for the transformer 600 with the additional primary windings 612 and the additional secondary windings 614. A relative amount of flux density is shown by an amount of shading in the flux density profiles 1000 and 1002. For example, the amount of flux at the reference point 906 of the flux density profile 1002 in FIG. 10B associated with the transformer 600 including the additional primary windings 612 and additional secondary windings 614 is greater than the amount of flux at the reference point 906 of the flux density profile 1000 in FIG. 10A associated with the transformer 600 without the additional primary windings 612 and the additional secondary windings 614. The increased amount of flux at the reference point 906 for the flux density profile 1002 shows that the additional primary windings 612 and the additional secondary windings 614 provide an increased amount of leakage flux at locations of the transformer 600 where the amount of magnetic flux is less than the amount of magnetic flux at other locations. In addition, the flux density profile also shows flux direction 1004 along the perpendicular axis 908 of the external surface 610 of the magnetic core assembly as well as flux direction 1006 along the longitudinal axis 908.

FIG. 11A is an exemplary graph of corner core flux density at the reference point 906 for a conventional transformer and the transformer 600 including the additional primary windings 612 and additional secondary windings 614. In some implementations, the conventional transformer can be an implementation of the transformer 600 without the additional primary and secondary windings 612 and 614 in contact with the external surfaces 310 of the magnetic core assembly. As can be seen from the graph, the transformer 600 has a greater corner core flux density at the reference point 906 than the conventional transformer.

FIG. 11B is an exemplary graph of excitation and leakage inductance for the conventional transformer and the transformer 600. As can be seen from the graph, the leakage inductance for the transformer 600 is greater than the leakage inductance for the conventional transformer due to the additional primary windings 612 and the additional secondary windings 614. In addition, the excitation inductance for the conventional transformer and the transformer 600 are approximately equal, which shows that the additional primary windings 612 and the additional secondary windings 614 can increase the leakage inductance of the transformer 600 without affect magnetic coupling characteristics of the transformer 600.

Figure 12:
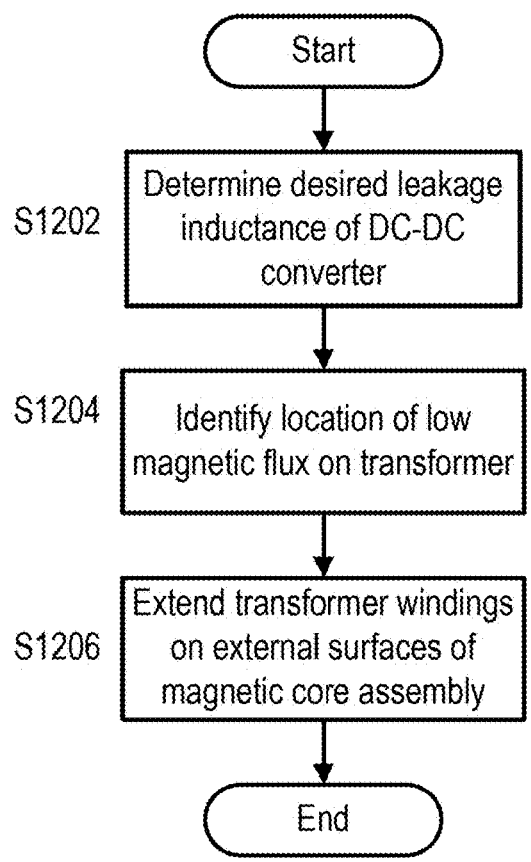
FIG. 12 is an exemplary graph of an integrated transformer-inductor design process.

FIG. 12 is an exemplary flowchart of an integrated transformer-inductor design process 1200. The integrated transformer-inductor design process 1200 is described herein with respect to the transformer 600 that is included in the DC-DC power conversion circuit 120, but the process 1200 can also be applied to other types of transformers and power conversion circuits.

At step S1202, desired amounts of leakage inductance for the primary leakage inductor 123 and the secondary leakage inductor 124 of the DC-DC power conversion circuit 120 are determined. In some implementations, the desired amounts of inductance for the primary leakage inductor 123 and the secondary leakage inductor 124 are associated with the capacitive power transfer in the DC-DC power conversion circuit 120. For example, the amount of capacitive power transfer between the primary side and secondary side of the DC-DC power conversion circuit 120 is based on series resonance that occurs between the primary leakage inductor 123 or secondary leakage inductor 124 and the cross-connected capacitors 102 or 104. When power is transferred from the primary side to the secondary side of the DC-DC power conversion circuit 120 during a duty cycle of the primary switch 106, a first capacitive power transfer time period occurs before an inductive power transfer time period, and a second capacitive power transfer time period occurs after the inductive power transfer time period. The first capacitive power transfer time period can be associated with the first resonant frequency, $\omega_1$, that can be defined by the equation, $$\omega_1 = \frac{1}{\sqrt{2L_{124}\frac{C_{102}}{2}}} = \frac{1}{\sqrt{L_{124}C_{102}}}.$$

The second capacitive power transfer time period can be associated with the second resonant frequency, $\omega_2$, which can be described by the equation, $$\omega_2 = \frac{1}{\sqrt{2\frac{C_{102}}{2}L_{123}}} = N\omega_1.$$

The desired amounts of inductance for the primary leakage inductor 123 and the secondary leakage inductor 124 can also be determined based on power and voltage characteristics of the power sources and electrical loads the DC-DC power conversion circuit 120, such as the primary DC power source 110 or the secondary DC power source 112.

At step S1204, one or more locations are identified on the external surfaces 610 of the magnetic core assembly 602 of the transformer 600 with the primary windings 606 and 608 where the magnetic flux is less than a predetermined threshold. In some implementations, a flux density profile can be developed for the transformer 600 without taking into account the additional primary windings 612 and additional secondary windings 614. The flux density profile for the transformer can be generated with simulation software and/or test equipment as would be known to one of ordinary skill in the art. The flux density profile 800 in FIG. 8A is one example of determining the locations on the magnetic core assembly 602 of the transformer 600 that have a magnetic flux density that is less than the predetermined threshold.

At step S1206, the additional primary windings 612 are extended from the primary windings 606 and the additional secondary windings 614 are extended from the secondary windings 608 to come in contact with the one or more external surfaces 610 where the amount of magnetic flux is less than the predetermined threshold. To increase the amount of primary leakage inductance, the primary windings 606 can also include additional primary windings 612 that are extended to come in contact with one or more external surfaces 610 of the magnetic core assembly 602. Likewise, to increase the amount of secondary leakage inductance, the secondary windings 608 can also include additional secondary windings 614 that are extended to come in contact the one or more external surfaces 610 of the magnetic core assembly 602. The additional primary windings 612 can contribute an amount of leakage inductance in addition to the leakage inductance from the primary windings 606 that corresponds to a total inductance of the primary leakage inductor 123 of the DC-DC power conversion circuit 120. Also, the additional secondary windings 614 can contribute an amount of leakage inductance in addition to the leakage inductance from the secondary windings to the secondary leakage inductor 124 of the DC-DC power conversion circuit 120.

In some aspects, one or more characteristics of the additional primary windings 612 and additional secondary windings 614 are based on achieving the predetermined amounts of inductance for the primary leakage inductor 123 and secondary leakage inductor 124. In one implementation, the one or more characteristics of the additional primary windings 612 and additional secondary windings 614 can include a shape, number of windings, or number of the external surfaces 610 in contact with the additional primary transformer windings 612 and additional secondary transformer windings 614.

Aspects of the present disclosure are directed to designing the transformer 600 to have a predetermined amount of primary leakage inductance and secondary leakage inductance without affecting magnetic coupling characteristics of the transformer 600. For example, the leakage inductance of the transformer 600 can be increased by extending the additional primary windings 612 and additional secondary windings 614 of the transformer 600 to come in contact with the one or more external surfaces 610 of the magnetic core assembly 602 that have a relatively low amount of magnetic flux. The implementations described herein can also be applied to other types or configurations of transformers, such as dual-core or multi-core transformers. The additional primary windings 612 and additional secondary windings 614 can also have varying shapes, numbers of windings, and the like.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. Accordingly, other implementations are within the scope that may be claimed.

The invention claimed is:

1. A transformer comprising:
   a magnetic core cube assembly including a cylindrical bobbin enclosed on five sides by external walls of the magnetic core cube assembly, transformer windings being wrapped around the cylindrical bobbin;
   primary transformer windings wrapped around the cylindrical bobbin of the magnetic core cube assembly with additional primary transformer windings that are extended to come in contact with one or more external surfaces of the external walls of the magnetic core cube assembly; and
   secondary transformer windings wrapped around the cylindrical bobbin of the magnetic core cube assembly with additional secondary transformer windings that are extended to come in contact with the one or more external surfaces of the external walls of the magnetic core cube assembly.

2. The transformer of claim 1, wherein one or more properties of the primary transformer windings and secondary transformer windings wrapped around the cylindrical bobbin of the magnetic core cube assembly are based on magnetic coupling between the primary transformer windings and the secondary transformer windings.

3. The transformer of claim 2, wherein the one or more properties of the primary transformer windings and the secondary transformer windings include a turn ratio, amount of primary or secondary current, transformer losses, or flux density.

4. The transformer of claim 2, wherein the predetermined amount of magnetic coupling between the primary transformer windings and the secondary transformer windings is based on inductive power transfer between a primary side and a secondary side of DC-DC power conversion circuitry.

5. The transformer of claim 2, wherein the predetermined amount of magnetic coupling between the primary transformer windings and the secondary transformer windings is unaffected by the additional primary transformer windings and the additional secondary transformer windings.

6. The transformer of claim 2, wherein the magnetic coupling between the primary transformer windings and the secondary transformer windings is based on power or voltage characteristics of a power source or power sink connected to DC-DC power conversion circuitry on each side of the transformer.

7. The transformer of claim 1, wherein a configuration of the additional primary transformer windings and the additional secondary transformer windings in contact with the one or more external surfaces of the magnetic core cube assembly produces a first amount of leakage inductance.

8. The transformer of claim 7, wherein the first amount of leakage inductance produced by the additional primary transformer windings and the additional secondary transformer windings is independent of a gap distance between a primary side and a secondary side of the magnetic core cube assembly.

9. The transformer of claim 7, wherein a total amount of leakage inductance of the transformer includes the first amount of leakage inductance produced by the additional primary transformer windings and the secondary transformer windings plus a second amount of leakage inductance produced by the primary transformer windings and the secondary transformer windings wrapped around the cylindrical bobbin of the magnetic core cube assembly.

10. The transformer of claim 1, wherein
the primary transformer windings and the additional primary transformer windings are associated with a primary leakage inductance of DC-DC power conversion circuitry; and
the secondary transformer windings and additional secondary transformer windings are associated with a secondary leakage inductance of the DC-DC power conversion circuitry.

11. The transformer of claim 10, wherein the primary leakage inductance and the secondary leakage inductance correspond to an amount of capacitive power transfer between a primary side and a secondary side of the DC-DC power conversion circuitry.

12. The transformer of claim 11, wherein the amount of capacitive power transfer between the primary side and the secondary side of the DC-DC power conversion circuitry is based on series resonance between the primary leakage inductance or the secondary leakage inductance of the transformer and one or more capacitors of the DC-DC power conversion circuitry.

13. The transformer of claim 12, wherein the one or more capacitors include a first capacitor and a second capacitor cross-connected across the transformer between the primary side and the secondary side of the DC-DC power conversion circuitry.

14. The transformer of claim 13, wherein a configuration of the additional secondary transformer windings on the one or more external surfaces of the magnetic core cube assembly is based on a first series resonance frequency between the first capacitor or the second capacitor and the secondary leakage inductance of the transformer.

15. The transformer of claim 13, wherein a configuration of the additional primary transformer windings on the one or more external surfaces of the magnetic core cube assembly is based on a second series resonance frequency between the first capacitor or the second capacitor and the primary leakage inductance of the transformer.

16. The transformer of claim 1, wherein the additional primary transformer windings and the additional secondary transformer windings are positioned on the one or more external surfaces of the magnetic core cube assembly at locations based on magnetic flux of the primary transformer windings or the secondary transformer windings.

17. The transformer of claim 1, wherein the additional primary transformer windings and the additional secondary transformer windings are configured on the one or more external surfaces of the magnetic core cube assembly based on power or voltage characteristics of a power source or power sink connected to DC-DC power conversion circuitry on each side of the transformer.

18. The transformer of claim 1, wherein the magnetic core cube assembly is a single-core assembly.

19. A system comprising:
a transformer including
a magnetic core cube assembly including a cylindrical bobbin enclosed on five sides by external walls of the magnetic core cube assembly, transformer windings being wrapped around the cylindrical bobbin,
primary transformer windings wrapped around the cylindrical bobbin of the magnetic core cube assembly with additional primary transformer windings that are extended to come in contact with one or more external surfaces of the magnetic core cube assembly, and
secondary transformer windings wrapped around the cylindrical bobbin of the magnetic core cube assembly with additional secondary transformer windings that are extended to come in contact with the one or more external surfaces of the magnetic core cube assembly; and
DC-DC power conversion circuitry including a first switch and a second switch on either side of the transformer with a first capacitor and a second capacitor cross-connected across the transformer.

* * * * *